United States Patent
Brammer et al.

(10) Patent No.: US 6,247,351 B1
(45) Date of Patent: Jun. 19, 2001

(54) VIBRATION PICKUP WITH A PRESSURE SLEEVE

(75) Inventors: Hartmut Brammer, Vaihingen; Holger Krebs, Erdmannhausen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/323,787

(22) Filed: Jun. 2, 1999

(30) Foreign Application Priority Data

Jul. 1, 1998 (DE) ............................................ 198 29 409

(51) Int. Cl.⁷ .................................................. G01L 23/22
(52) U.S. Cl. ............................................ 73/35.11; 73/654
(58) Field of Search .................................... 73/35.11, 654, 73/652, 35.01, 35.07, 35.09, 35.12; 310/329; 123/435

(56) References Cited

U.S. PATENT DOCUMENTS

| | | | |
|---|---|---|---|
| 4,944,179 | 7/1990 | Komurasaki | 73/654 |
| 5,398,540 | * 3/1995 | Entenmann et al. | 73/35.11 |
| 5,440,933 | * 8/1995 | Brammer et al. | 73/35.11 |
| 5,739,418 | * 4/1998 | Hackel et al. | 73/35.1 |
| 5,798,453 | * 8/1998 | Brammer et al. | 73/35.11 |
| 5,872,307 | * 2/1999 | Brammer et al. | 73/35.11 |

FOREIGN PATENT DOCUMENTS

| | | |
|---|---|---|
| 44 03 660 | 10/1994 | (DE) . |
| 195 24 152 | 5/1996 | (DE) . |
| 195 24 148 | 8/1996 | (DE) . |
| 195 42 729 | 10/1996 | (DE) . |
| 195 24 147 A1 | 1/1997 | (DE) . |

* cited by examiner

Primary Examiner—Helen Kwok
(74) Attorney, Agent, or Firm—Michael J. Striker

(57) ABSTRACT

A vibration pickup has a pressure sleeve which is directly or indirectly mountable on a component causing vibration, a seismic mass, a sensor element arranged under the seismic mass and held with an axial pretensioning radially outwardly on the pressure sleeve and is electrically contactable, the seismic mass in non-mounted condition abutting only partially against an arrangement with the sensor element while in predetermined ring-shaped regions a distance is available to the arrangement with the sensor element, and after mounting with covering of the distance a substantially plane abutment of the seismic mass against the arrangement with the sensor element with an axial pretensioning is produced.

13 Claims, 1 Drawing Sheet

VIBRATION PICKUP WITH A PRESSURE SLEEVE

BACKGROUND OF THE INVENTION

The present invention relates to a vibration pickup with a pressure sleeve.

Vibration pickups of the above mentioned general type are known in the art. One of such vibration pickups with a pressure sleeve is disclosed for example in the German patent document DE 195 24 147.9. It is formed as a knock sensor for monitoring the operation of an internal combustion engine in a motor vehicle. The pressure sleeve is joined through an abutment region fixedly to a component which causes vibrations, for example a motor block of the internal combustion engine.

The vibrations to be detected are knock noises of the internal combustion engine during the operation. They are transmitted through a pressure sleeve to a piezo-ceramic disk as a sensor element, with intermediately located contact disks and insulating disks which allow picking up of the signal, so as to form an evaluatable electrical output signal.

This type of mounting or clamping of the sensor element on the pressure sleeve and the mounting of the pressure sleeve on the vibrating component has a great influence on the manufacture. The clamping of the sensor element together with a plurality of individual components, for example with a spring and a seismic mass is performed in the known vibration pickup with a threaded ring which is screwed on the corresponding thread of the pressure sleeve and directly abuts on the seismic mass.

This known threaded ring and the thread is a substantial cost factor on the pressure sleeve and alternative mounting possibilities are needed. All components must be firmly compressed during the occurring accelerations with a defined mechanical pretensioning and must remain this way. When the pretensioning changes, also the characteristic line changes and evaluation becomes more difficult.

SUMMARY OF THE INVENTION

Accordingly, it is an object of the present invention to provide a vibration pickup with a pressure sleeve which avoids the disadvantages of the prior art.

In keeping with these objects and with others which will become apparent hereinafter, one feature of present invention resides, briefly stated, in a vibration pickup with a pressure sleeve, in which the seismic mass in a non dismounted condition abuts only partially against the arrangement with the sensor element, and in predetermined ring-shaped regions a distance for arrangement with the sensor element is provided, and after the mounting with overcoming of the distance with the substantially plane abutment of the seismic mass against the arrangement with the sensor element, the axial pretensioning is produced.

When the vibration pickup is designed in accordance with the present invention, it has the advantage that with dispensing with a spring, the required above mentioned axial pretensioning can be provided with optimal pressure distribution on the clamped sensor element of the pressure sleeve of the vibration pickup.

In accordance with the present invention, the seismic mass in non-mounted condition has, in predetermined ring-shaped regions, a simply arrangable distance, such as for example by a conical contour, with respect to the sensor element, or with respect to the intermediately located insulating disk and the contact disk. Since for example with the threaded ring during screwing a pressure for reducing of this distance is applied, the required pressing force for a clamping of the sensor element is produced.

After the mounting, or in other words, after the performed screwing of the threaded ring on the corresponding thread on the pressure sleeve, this side of the seismic mass is located substantially plane. The now applied axial pretensioning for the sensor element is provided by flat relatively identically distributed pressing forces, since first the seismic mass is applied in the regions without a distance, and then under pressure of the threaded ring, the distance must be covered.

With the inventive vibration pickup, the disadvantages of the prior art are avoided with a plane abutment of the seismic mass in the non-mounted condition on the arrangement with the sensor element. In the prior art a high force is applied on the pressure introducing point of the threaded ring or a spring during mounting. After the mounting this can lead to a non uniform force distribution on the abutment surface of the seismic element on the arrangement of the sensor element.

In accordance with a preferable embodiment of the present invention, the seismic mass in the non-mounted condition on the side which is opposite to the arrangement with the sensor element, is provided with an inclined contour in a radial section. The inclined contour has radially inner and radially outer portions.

In order to obtain a uniform pressure distribution in the sensor element, in some cases it is important where a ring-shaped abutment of the threaded ring on the seismic mass is performed. It has to be taken into consideration that the vibration pickup is produced with different long radial expansion of the seismic mass. In many vibrations pickups the radial expansion of the seismic mass is relatively long. Therefore there is a so-called lever action during the ring-shaped abutment of the nut on the seismic mass. If the ring-shaped abutment is somewhat exactly centrally performed on the seismic mass, then the edge regions of the piezo-ceramic disk are somewhat lifted. For this reason, it is advantageous when with a ring-shaped abutment the engagement of the threaded ring on the seismic mass is performed off-center. In particular, it can be performed with offset in direction to the conical formation, or in other words the distance.

In accordance with a further embodiment of the present invention, the seismic mass in the non-mounted condition has a concave corner in the radial section at the side which is opposite to the arrangement of the sensor element. Here in a simple manner also a central abutment of the threaded ring against the seismic mass can be performed. For further averaging of the force transmission the seismic mass can be provided with a corresponding incline or a corresponding contour at the side facing the threaded ring.

The inventive vibration pickup with a conical or concave but same formation of the non mounted seismic mass on the upper and the lower side moreover provides a safety effect. The reason is that a false mounting of the seismic mass during the mounting process is reliably prevented. The abutment of the threaded ring against the seismic mass can be designed differently. The threaded ring can be both plane, or in other words flat, or also ring-shaped and abut against the seismic mass. The objective of the conical or concave formation of the seismic mass is a uniform pressure distribution in the sensor element, for example in a piezo-ceramic disks.

The shape end size of the conical or concave formation of the upper surface of the seismic mass can be determined in a simple manner in connection with the pretensioning to be produced by the threaded ring. With the knock sensor which is utilized in the process, as the vibration pickup, it can be advantageous to provide at the inner side, or in other words in the region of the opening in a pressure sleeve, a height of approximately 0.2 mm.

In accordance with a preferable embodiment of the invention, the component which causes vibration is a motor block of international combustion engine in a motor vehicle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
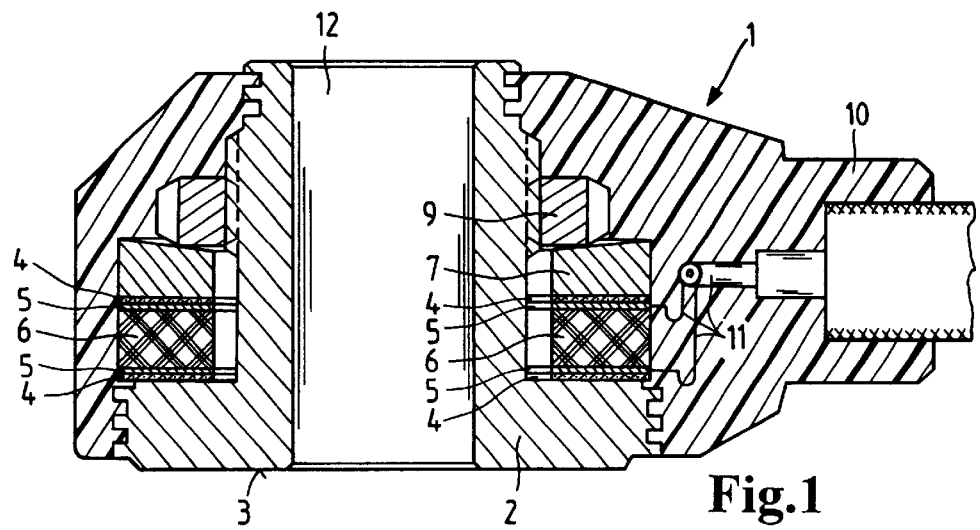
FIG. 1 is a view showing a section of a housing of a knock sensor which is formed as a vibration pickup with a seismic mass having a conical contour before a mounting.

A vibration pickup in accordance with the present invention is formed as a knock sensor for an internal combustion engine as shown in FIG. 1. It has an outer synthetic plastic housing 1, and a pressure sleeve 2 arranged in the housing. The pressure sleeve 2 abuts at its lower surface 3 on the not shown motor block, whose vibrations must be detected.

On the periphery of the pressure sleeve 2 starting from the lower edge, the following components are arranged: an insulating disk 4, a first contact disk 5, a piezo-ceramic disk 6 formed as a sensor element, and moreover a second contact disk 5 as well as a second insulating disk 4. A seismic mass 7 is placed on this arrangement. It is pressed in direction toward the piezo-ceramic disk 6 with a ring 9 which is screwable or is mountable in a similar manner.

The housing 1 which is composed of synthetic plastic material and produced by injection molding has an integrated connection part 10. An electrical connector 11 for a contact disk 5 is injection molded in the integrated connection part 10. The electrical connector 11 is formed of one piece with the corresponding contact disk 5. Therefore an electrical connection is produced through both contact disks 5 to the both sides of the piezo-ceramic disk 6. The electrical voltage which is produced during application of pressure to the piezo-ceramic disk 6 is taken by the connectors 11.

The pressure sleeve 2 has a central recess formed for example as an opening 12. A not shown mounting screw extends through the opening 12. The knock sensor is mountable by the mounting screw directly or indirectly on a motor block of the internal combustion engine. During the mounting of the knock sensor the total torque applied to the pressure sleeve 2 is transmitted through the lower surface 3. In other words, on the piezo-ceramic disk 6 which forms a sensor element no force acts during the mounting.

A required axial pretensioning force during clamping of the piezo ceramic disk 6 is selected so that axial forces act on the piezo-ceramic disk 6 directly without worsening of the electrical signal. They are substantially independent from thermal expansions as well as unavoidable upsetting of the pressure sleeve 2 during the mounting. The pulses which are applied by the seismic mass 7 proportionally to the vibrations of the internal combustion engine are converted in the piezo-ceramic disk 6 into voltages pulses which are readable on a corresponding measuring device.

Figure 2:
FIG. 2 is a detailed section of the seismic mass before the mounting.
Figure 3:
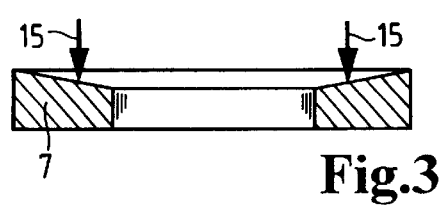
FIG. 3 is a view showing a detailed section of the seismic mass after the mounting.

An upper, radially inwardly inclined contour of the seismic mass 7 can be seen in the knock sensor in accordance with FIG. 1. The seismic mass 7 before the mounting is shown in FIG. 2. It can be seen that the seismic mass 7 originally has a conical contour, or in other words both the lower and the upper sides are inclined radially inwardly. In FIG. 3 the seismic mass 7 is shown after the mounting, as in the condition shown in FIG. 1 in detail. Arrows 15 illustrate in FIG. 3 the ring-shaped occurring pressing force which is applied from the threaded ring on FIG. 1 during the mounting, to the upper side of the seismic mass 7. The lower side of the seismic mass 7 is here formed for a plane abutment against the piezo-electric disk 6 through the contacting and insulating disks 5 and 4.

Figure 4:
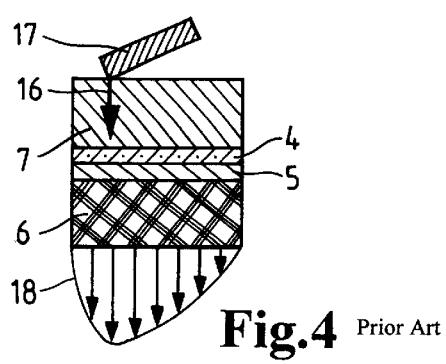
FIG. 4 is a view showing a detailed section of the arrangement for the seismic mass on a pressure sleeve in accordance with the prior art, including the pressure course.

FIG. 4 shows an arrangement of a seismic mass 8 with a rectangular contour in accordance with the prior art in a section. It can be seen that a ring-shaped pressure application in accordance with the arrow 16 with a threaded ring or a spring 17 leads to a non uniform pressure distribution 18 on the piezo-ceramic disk 6 through the abutment surface.

Figure 5:
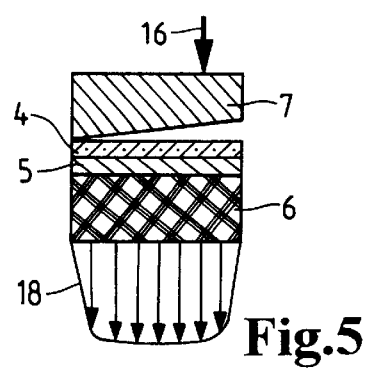
FIG. 5 is a detailed section of the arrangement of the seismic mass on a pressure sleeve with an incline, on the seismic mass, including the pressure course.

The inventive arrangement of FIG. 5 shows seismic mass 7 which is inclined at the lower side. A radially outer introduction of the pressing force 17 leads to a plane abutment against the piezo-ceramic disk 6, through the insulating and contacting disks 4 and 5, and to a uniform pressure distribution 18. The reason is that first the seismic mass 7 abuts in the regions without a distance, and the pressure of the threaded ring which is screwed on must then overcome this distance.

Figure 6:
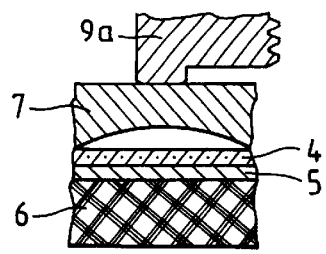
FIG. 6 is a detailed section of the arrangement of the seismic mass on a pressure sleeve with a concave contour of the seismic mass.

FIG. 6 shows a deviation of the seismic mass 7 with a concave lower side and a threaded ring 9a. It is formed so that a central introduction of the pressing force is performed during screwing on the threaded ring 9a. Here the central distance of the seismic mass 7 to the arrangement with the piezo-ceramic disk 6 must be covered, until a plane abutment is obtained.

It will be understood that each of the elements described above, or two or more together, may also find a useful application in other types of constructions differing from the types described above.

While the invention has been illustrated and described as embodied in a vibration pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A vibration pickup, comprising a pressure sleeve which has a flange-shaped end directly or indirectly contactable with and mountable on a component causing a vibration; a seismic mass; an arrangement arranged under said seismic mass, said arrangement including an electrical insulation, contact discs and a sensor element and being held with an axial pretensioning against the flange-shaped end radially on said pressure sleeve and being electrically contactable through said contact discs and a connecting part, said seismic mass in non-mounted condition abutting only partially against the arrangement with said sensor element while in predetermined ring-shaped regions a distance is available to the arrangement with said sensor element, and after mounting with covering of said distance and a substantially plane abutment of said seismic mass against the arrangement with said sensor element with an axial pretensioning is produced.

2. A vibration pickup as defined in claim 1; and further comprising a screwable-on threaded ring which provides holding of said sensor element against said pressure sleeve.

3. A vibration pickup as defined in claim 1; and further comprising a mounting element which provides holding of said sensor element against said pressure sleeve.

4. A vibration pickup as defined in claim 1; and further comprising a contact disk through which said sensor element is electrically contactable.

5. A vibration pickup as defined in claim 1; and further comprising a connecting part through which said sensor element is electrically contactable.

6. A vibration pickup as defined in claim 1; and further comprising a mounting element by which said sensor element is held on said pressure sleeve and which is formed so that a pressure for reducing the distance is applied on regions of said seismic mass which are opposite to said ring-shaped regions.

7. A vibration pickup as defined in claim 1, wherein said seismic mass in the non-mounted condition on a side opposite to the arrangement with said sensor element has a contour which is inclined in a radial cross-section and is provided with a radially inwardly located distance.

8. A vibration pickup as defined in claim 1, wherein said seismic mass in the non-mounted condition at a side which is opposite to said arrangement with said sensor element has a contour which is inclined in a radial section with a radially outwardly located distance.

9. A vibration pickup as defined in claim 1, wherein said seismic mass in the non-mounted condition at a side which is opposite to said arrangement with said sensor element has a concave contour in a radial section.

10. A vibration pickup as defined in claim 1; and further comprising a mounting element with which said sensor element is held on said pressure sleeve, said seismic mass on a side facing said mounting element being provided with a corresponding incline.

11. A vibration pickup as defined in claim 1; and further comprising a mounting element with which said sensor element is held on said pressure sleeve, said seismic mass on a side facing said mounting element being provided with a corresponding concave contour.

12. A vibration pickup as defined in claim 1, wherein said sensor element is formed as a piezo-ceramic disk.

13. A vibration pickup as defined in claim 1, wherein said pressure sleeve is formed so that it is mountable on a motor block of an internal combustion engine in a motor vehicle, which forms the component causing the vibrations.

* * * * *